United States Patent [19]

McWilliams et al.

[11] Patent Number: 5,417,949
[45] Date of Patent: May 23, 1995

[54] $NO_x$ ABATEMENT PROCESS

[75] Inventors: John P. McWilliams, Woodbury; David S. Shihabi, Pennington, both of N.J.; Richard F. Socha, Newtown, Pa.; Hye K. C. Timken, Woodbury, N.J.

[73] Assignee: Mobil Oil Corporation, Fairfax, Va.

[21] Appl. No.: 112,396

[22] Filed: Aug. 25, 1993

[51] Int. Cl.⁶ .............................................. B01J 8/02
[52] U.S. Cl. ................................................ 423/239.2
[58] Field of Search ............... 423/239.2, 705, 235; 502/350

[56] References Cited

U.S. PATENT DOCUMENTS

| | | | |
|---|---|---|---|
| 3,900,554 | 8/1975 | Lyon | 423/235 |
| 4,220,632 | 9/1980 | Pence et al. | 423/239 |
| 4,778,665 | 10/1988 | Krishnamurthy et al. | 423/239 |
| 4,961,917 | 10/1990 | Byrne | 423/239 |
| 4,973,399 | 11/1990 | Green et al. | 502/67 |
| 5,143,702 | 9/1992 | Beck et al. | 423/239 |
| 5,143,879 | 9/1992 | Whitehurst | 423/329 |
| 5,238,676 | 8/1993 | Roth et al. | 423/713 |

*Primary Examiner*—Gary P. Straub
*Assistant Examiner*—Thomas G. Dunn, Jr.
*Attorney, Agent, or Firm*—Alexander J. McKillop; Dennis P. Santini; Robert B. Furr, Jr.

[57] ABSTRACT

A process for converting noxious nitrogen oxides present in oxygen-containing gaseous effluents to $N_2$ and $H_2O$ comprising reacting the gaseous effluent with an effective amount of ammonia in the presence of a catalyst having a Constraint Index of up to about 12, said catalyst having a Constraint Index of up to about 12, said catalyst being composited with a binder containing at least one selected from the group consisting of titania, zirconia, and silica.

10 Claims, No Drawings

$NO_x$ ABATEMENT PROCESS

CROSS-REFERENCE TO RELATED APPLICATIONS

This application is related by subject matter to U.S. application Ser. No. 08/112,501 filed on even date herewith.

FIELD OF THE INVENTION

This invention relates to a method for reducing the nitrogen oxide content of a waste gas stream.

BACKGROUND OF THE INVENTION

In recent years there has been an increased concern in the United States and elsewhere about air pollution from industrial emissions of noxious oxides of nitrogen, sulfur and carbon. Government agencies, in response to such concerns, have in some cases already placed limits on allowable emissions of one or more of the pollutants, and the trend is clearly in the direction of increasingly stringent restrictions. Petroleum fuel refineries are particularly affected by present and anticipated restrictions on emissions, particularly emissions of nitrogen oxides and carbon monoxide.

Although several nitrogen oxides are known which are relatively stable at ambient conditions, it is generally recognized that two of these, viz. nitric oxide (NO) and nitrogen dioxide ($NO_2$), are the principal contributors to smog and other undesirable environmental effects when they are discharged into the atmosphere. These effects will not be discussed further here since they are well recognized.

Nitric oxide and nitrogen dioxide, under appropriate conditions, are interconvertible according to the equation

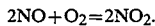

$$2NO + O_2 = 2NO_2.$$

For purposes of the present invention, $NO_x$ will be used herein to represent nitric oxide, nitrogen dioxide (the principal noxious oxides of nitrogen), and/or mixtures thereof.

U.S. Pat. No. 3,900,554 to Lyon describes a homogeneous gas phase thermal reaction to remove $NO_x$ from combustion effluent by adding 0.4 to 10 moles (preferably 0.5 to 1.5 moles) of ammonia followed by heating to 1600° C. to 2000° C. The $NO_x$ content is lowered as a result of its being reduced to nitrogen by reaction with ammonia. The so-called "selective catalytic reduction" (SCR) type process which operates at a much lower temperature, 200° to 600° C., is exemplified by U.S. Pat. No. 4,220,632 to Pence et al., which describes a process for reducing $NO_x$ from a fossil fuel fired power generation plant, or from other industrial plant off-gas stream, to elemental nitrogen and/or innocuous nitrogen oxides by employing ammonia as reductant and, as catalyst, the hydrogen or sodium form of a zeolite having pore openings of about 3 to 10 Angstroms. The Pence et al. patent is incorporated by reference for its description of selective catalytic reduction (SCR) processes for reducing $NO_x$ emissions.

Now it has been found that the selection of binder material improves the efficacy of catalytic $NO_x$ reduction.

SUMMARY OF THE INVENTION

This invention provides a process for converting noxious nitrogen oxides present in oxygen-containing gaseous effluents to $N_2$ and $N_2O$ comprising reacting the gaseous effluent with an effective amount of ammonia in the presence of a zeolite catalyst having a Constraint Index of up to about 12, said catalyst being composited with a binder containing at least one selected from the group consisting of titania, zirconia, and silica. The binder material preferably comprises essentially no added alumina, and is preferably substantially free of alumina. In a particularly preferred embodiment, the catalyst is prepared by a method which imparts superior mechanical stability and low binder acidity to the finished composite catalyst. The preferred preparation method comprises the steps of:

(a) providing a substantially homogenous mixture of molecular sieve material, a low acidity titania binder material and an aqueous slurry of titanium oxide hydrate to provide a formable, e.g., extrudable, mass;

(b) forming, e.g., extruding, the formable, e.g, extrudable, mass resulting from step (a); and (c) calcining the formed product, e.g., extrudate, resulting from step (b).

Prior to the calcination step (c), the product of step (b) may be dried at a temperature of, e.g., at least 65° C., e.g., from 65° C. to about 260° C., for a time sufficient to dry the step (b) product, e.g., from about 5 minutes, such as when a belt dryer is used, to at least about 1 hour. Calcining step (c) may take place in air, or inert gas, at temperatures ranging, e.g., from about 260° C. to about 815° C. for periods of time ranging, e.g., from about 1 to about 48 hours or more.

The calcined product, e.g., extrudate, can be subjected to other operations such as base exchange, dealumination, steaming, impregnating with catalytically active metal(s), the details of which are well known in the art.

Although the forming step (b) may involve tableting or pelleting, extrusion is preferred. The extrusion process used herein preferably involves the use of a screw extruder. Such screw extruders are also known as auger extruders or auger-type extruders. Screw extruders are distinguishable from extrusion presses, which are also useful in the preferred catalyst preparation method. In an extrusion press or ram extruder, a mass of extrudable material is forced through a die by means of a plunger or piston which may be mechanically or hydraulically operated.

By virtue of the design of an extrusion press, very large compaction forces may be generated therein. Therefore, it is possible to form an extrudate from masses which would not be extrudable under lower compacting forces by using the large compaction forces of an extrusion press. However, another inherent feature of an extrusion press results in the disadvantage that extrusions cannot be conducted in a continuous fashion. Extrudable masses can only be passed through the die one batch at a time, the piston or plunger being withdrawn from the die between batches.

Unlike extrusion presses, the preferred screw extruders can be operated in a continuous fashion. In a screw extruder, a feed is transported from a feed point to the die by means of a turning screw or auger. The feed is either introduced as an extrudable mass or is converted into an extrudable mass within the extruder with the aid of mixing action imparted by the screw. An example of a screw extruder is a 2" (5 cm) Bonnot extruder. Unlike extrusion in extrusion presses, however, high pressures cannot be generated in screw extruders. Therefore, although extrudate may be formed at a faster rate in screw extruders, by virtue of continuous operation, such screw extruders are more limited than extrusion presses insofar as feeds which may be employed therein. More particularly, masses which are only extrudable under high compaction forces are not extrudable in screw extruders.

Unlike alumina binders, low acidity refractory oxide binders such as titania, zirconia, or silica do not interact with molecular sieves such as, for example, zeolites, to increase the acid catalytic activity thereof. Consequently, molecular sieves can be bound with low acidity titania, zirconia, or silica in accordance with the method of this invention without increasing the molecular sieves intrinsic activity as might occur with an alumina binder.

The preferred catalyst preparation method requires the presence of an aqueous slurry of hydrous titania in the extrudable mass of step (a).

The method for preparing a low acidity titania-bound molecular sieve useful in this invention is not limited to any particular molecular sievce material and in general includes all metallosilicates, metallophosphates, silicoaluminophosphates, and layered and pillared layered materials, which effectively catalyze the selective catalytic reduction reaction of the present invention. Particularly useful are the aluminosilicates whether or not previously dealuminized to increase the framework silica:alumina ratio. Typical zeolites include ZSM-4 (Omega), ZSM-5, ZSM-11, ZSM-12, ZSM-20, ZSM-22, ZSM-23, ZSM-35, ZSM-48, ZSM-50, MCM-22, PSH-3, Beta, X, Y, and L, as well as ferrierite, mordenite, dachiardite, clinoptilolite, offretite, erionite, gmelinite, chabazite, etc. Other molecular sieves contemplated include, for example, MCM-9, VPI-5, MCM-20, SAPO-11, SAPO-17, SAPO-34, SAPO-37, and MCM-41.

It is to be understood that the identification of the molecular sieves, e.g., zeolites, be resolved on the basis of their respective X-ray diffraction patterns. The present invention contemplates utilization of such molecular sieves wherein the mole ratio of silica-to-metal oxide is essentially unbounded. The molecular sieves are not limited to specific silica:metal oxide mole ratios, since they may be substantially metal-free and, yet, having the same crystal structure as the disclosed materials, may be useful or even preferred in some applications. It is the crystal structure, as identified by the X-ray diffraction "fingerprint", which established the identity of the specific molecular sieve, e.g., zeolite, material.

The titania binder material herein can be combined with other refractory oxides of metals of Groups IVA and IVB of the Periodic Table of the Elements. Particularly useful are the oxides of silicon, germanium and zirconium. Combinations of such oxides with each other and with other oxides are also useful provided that at least about 40 weight percent, and preferably at least 50 weight percent, of the total oxide is titania or a combination of the aforesaid Group IVA and/or Group IVB metal oxides. Thus, mixtures of oxides which can be used to provide the binder material herein include silica-titania and titania-zirconia.

It is an essential requirement of the present method that the formable, e.g., extrudable, mass prepared in step (a) contain at least about 0.5 wt. %, usually from about 1 to about 20 wt. %, preferably from about 2 to about 8 wt. % of the aqueous slurry of hydrous titania.

The low acidity titania is added in dry particulate form, e.g., titanium oxide hydrate, so as to control the moisture content of the binder/zeolite/dispersant mixture at a level to ensure satisfactory forming, e.g., extrusion.

The composition of the formable mass of step (a) will be as follows, in weight %:

| Component | Useful | Usually | Preferably |
| --- | --- | --- | --- |
| Molecular Sieve | 10 to 90 | 25 to 85 | 40 to 80 |
| Aqueous Slurry of Hydrous Titania | at least 0.5 | 1 to 20 | 2 to 8 |
| Titanium Oxide Binder | 5 to 90 | 10 to 75 | 20 to 60 |

An extrusion aid, such as hydroxypropyl methylcellulose, may be added to the mixture of molecular sieve, e.g., zeolite, titania binder and aqueous slurry of hydrous titania, which is to be pelleted, tableted, or extruded. The extrusion aid is generally added in an amount in the range of from about (give range that encompasses 2 wt. %).

The relative proportions of molecular sieve and low acidity refractory oxide binder on an anhydrous basis in the final catalyst can vary widely with the molecular sieve content ranging from between about 1 to about 99 weight percent, e.g., in the range of from about 5 to about 80 weight percent, of the dry composite.

Zeolites which are useful as for catalyzing the selective catalytic reduction process of the present catalyst include zeolite Beta, zeolite X, zeolite L, zeolite Y, ultrastable zeolite Y (USY), dealuminized Y (Deal Y), mordenite, ZSM-3, ZSM-5, ZSM-11, ZSM-12, ZSM-20, ZSM-22, ZSM-23, ZSM-35, ZSM-50, compositions of U.S. Pat. No. 4,962,239, e.g., MCM-22 and PSH-3, and mixtures of any of the foregoing. As used herein, large-pore size refers to pores having an average cross-section of greater than about 6 Angstroms, and medium-pore size refers to pores having an average cross-section of from about 4 to about 6 Angstroms.

Also included within the definition of the useful molecular sieves are crystalline porous silicoaluminophosphates such as those disclosed in U.S. Pat. No. 4,440,871, the catalytic behavior of which is similar to that of the aluminosilicate zeolites.

Zeolite Beta is described in U.S. Pat. No. Re. 28,341 (of original U.S. Pat. No. 3,308,069), to which reference is made for details of this catalyst.

Zeolite X is described in U.S. Pat. No. 2,882,244, to which reference is made for the details of this catalyst.

Zeolite L is described in U.S. Pat. No. 3,216,789, to which reference is made for the details of this catalyst.

Zeolite Y is described in U.S. Pat. No. 3,130,007, to which reference is made for details of this catalyst.

Low sodium ultrastable zeolite Y (USY) is described in U.S. Pat. Nos. 3,293,192; 3,354,077; 3,375,065; 3,402,996; 3,449,070; and 3,595,611, to which reference is made for details of this catalyst.

Dealuminized zeolite Y can be prepared by the method disclosed in U.S. Pat. No. 3,442,795, to which reference is made for details of this catalyst.

Zeolite ZSM-3 is described in U.S. Pat. No. 3,415,736, to which reference is made for details of this catalyst.

Zeolite ZSM-5 is described in U.S. Pat. No. Re. 29,948 (of original U.S. Pat. No. 3,702,886), to which reference is made for details of this catalyst.

Zeolite ZSM-11 is described in U.S. Pat. No. 3,709,979, to which reference is made for the details of this catalyst.

Zeolite ZSM-12 is described in U.S. Pat. No. 3,832,449, to which reference is made for the details of this catalyst.

Zeolite ZSM-20 is described in U.S. Pat. No. 3,972,983, to which reference is made for the details of this catalyst.

Zeolite ZSM-22 is described in U.S. Pat. No. 4,556,477, to which reference is made for the details of this catalyst.

Zeolite ZSM-23 is described in U.S. Pat. No. 4,076,842, to which reference is made for the details of this catalyst.

Zeolite ZSM-35 is described in U.S. Pat. No. 4,016,245, to which reference is made for the details of this catalyst.

Zeolite ZSM-50 is described in U.S. Pat. No. 4,640,829, to which reference is made for details of this catalyst.

U.S. Pat. No. 4,962,239 to which reference is made above is incorporated herein by reference in its entirety. This patent teaches a process for preparing ethers over catalyst comprising a particular class of zeolites, e.g., MCM-22 and PSH-3.

MCM-41 is described in U.S. Pat. No. 5,098,684, to which reference is made for the details of this catalyst.

The original cations associated with each of the molecular sieves utilized herein can be replaced by a wide variety of other cations employing techniques well known in the art. Typical replacing cations including hydrogen and hydrogen precursors, e.g., ammonium and alkyl ammonium, and metal cations. Suitable metal cations include metals such as rare earth metals, as well as metals of Groups IIA, IIIA, IVA, IB, IIB, IIIB, IVB, VIB and VIII of the Periodic Table, e.g., platinum and palladium.

Typical ion-exchange techniques call for contacting the selected molecular sieve, e.g., zeolite, with a salt of the desired replacing cation. Although a wide variety of salts can be employed, particular preference is given to chloride, nitrates and sulfates. Representative ion-exchange techniques are disclosed in a wide variety of patents including U.S. Pat. Nos. 3,140,249; 3,140,251; and 3,140,253.

Following contact with a solution of the desired replacing cation, the molecular sieve is then preferably washed with water and dried at a temperature ranging from about 65° C. to about 315° C. and thereafter calcined in air, or other inert gas, at temperatures ranging from about 260° C. to about 815° C. for periods of time ranging from about 1 to about 48 hours or more. Catalysts of improved selectivity and other beneficial properties can be obtained by subjecting the molecular sieve to treatment with steam at elevated temperatures ranging from about 260° C. to about 650° C., and preferably from about 400° C. to about 540° C. The treatment can be accomplished in an atmosphere of 100% steam or in an atmosphere consisting of steam or ammonia and some other gas which is essentially inert to the molecular sieves. A similar treatment can be accomplished at lower temperatures and elevated pressure, e.g., from about 175° C. to about 375° C. at from about 10 to about 200 atmospheres.

If so desired, the catalyst can be treated with reagents prior to steaming and with organics still contained to remove alumina from the outside surface, or calcined in air or inert atmosphere to remove the organics and then ion exchanged to the ammonium form or other desired metal exchanged form. It is a special attribute herein that it has sufficient integrity to withstand treatment with acids so that it is possible to extrude an aluminosilicate zeolite such as zeolite Y and steam, acid extract, calcine or effect combinations thereof to produce a stable high silica-to-alumina Y in an easily handled form. Processes for dealuminizing Y are well known in the art, i.e., see Rabo, *Zeolite Chemistry and Catalysis,* ACS Monograph 171, chapter 4 (1976), the entire disclosure being incorporated by reference herein.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis,* Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis,* Vol. 61, p. 395.

| Conversion Conditions For Decreasing Nitrogen Oxide Content of a Waste Gas Stream | | | |
|---|---|---|---|
| | Useful | Typical | Preferred |
| Temperature, °C. | 200 to 700 | 250 to 600 | 275 to 550 |
| Pressure | Sufficient to maintain flow across reaction zone | Approximately atmospheric | Slightly above atmospheric |
| GHSV, hr.$^{-1}$ | 5 to 100,000 | 10 to 100,000 | 200 to 100,000 |

The NO$_x$ abatement process of this invention includes mixing ammonia (NH$_3$) in the nitrogen-containing waste gas at a NH$_3$:NO$_x$ molar ratio of from about 0.1:1 to about 10:1, preferably from about 0.1:1 to about 1.5:1, more preferably from about 0.4:1 to about 1.1:1. For a discussion of conversion conditions which are useful in conventional SCR processes (which process conditions are also useful, albeit not preferred, in the present inventive process) see U.S. Pat. Nos. 4,695,438 and 4,798,817 to Becker and Jung, which are incorporated by reference as if set forth at length herein.

The method of the present invention is particularly useful for treating the flue gas generated by a fluid catalytic cracking (FCC) process unit. The FCC flue gas is typically available at about 500° C., and temperatures in this range are compatible with the present process. In contrast, conventional SCR catalysts, such as Ti-V, operate optimally at lower temperatures, e.g., 375° C. Thus the present process requires no waste gas cooling step to effectively process hot FCC regenerator flue gas.

Coupling the flue gas outlet of an FCC regenerator with a conventional SCR process has, in the past, raised the concern that conventional SCR catalyst (e.g., Ti-V SCR catalyst which promotes oxidation) could experience dangerous thermal runaway if an operational upset in the FCC regenerator slugged unburned hydrocarbons into the FCC regenerator flue gas stream, and subsequently to the SCR process. In contrast, the catalysts useful in the process of this invention are not oxidation catalysts, and therefore any thermal excursion caused by hydrocarbon slugging would be markedly less severe than with a convention Ti-V SCR catalyst.

EXAMPLES

This invention will now be illustrated by example, which illustration is not to be construed as limiting the scope of the invention, said scope being determined by this entire specification including appended claims.

Examples 1 and 8 employ a titania-bound catalyst preparation method in the absence of a binding agent. Examples 2, 3, 9, 10 and 14 utilize ammonium zirconium carbonate (AZC) as the binding agent. Example 4 utilizes $TiOCl_2$ as the binding agent. Example 5 utilizes titanium isopropoxide as the binding agent. Example 13 utilizes NaOH as the binding agent. Example 6 uses colloidal silica as the binding agent.

EXAMPLE 1

An n-propyl amine-containing ZSM-5 was ammonium exchanged with 5 cc of $NH_4NO_3$ solution (1M) per gram of zeolite for 2 hours and then dried in an oven at 120° C. Titanium oxide hydrate sold by Kemira was used as the titania source and no binding agent was used. A physical mixture of 65 parts by weight ZSM-5 and 35 parts by weight titania powder was mulled to form a uniform mixture. A sufficient amount of deionized water was added to form an extrudable mixture with a solids content in the range of about 50–65 wt. %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 1.

EXAMPLE 2

An n-propyl amine-containing ZSM-5 was ammonium exchanged with 5 cc of $NH_4NO_3$ solution (1M) per gram of zeolite for 2 hours and then dried in an oven at 120° C. Titanium oxide hydrate sold by Kemira was used as the titania source and AZC sold by Magnesium Elektron was used as the binding agent. A physical mixture of 65 parts by weight ZSM-5, 33 parts by weight titania powder and 2 parts by weight AZC was mulled to form a uniform mixture. All components were blended based on parts by weight on a 100% solids basis. An additional 2 wt. % Methocel (hydroxypropyl cellulose) was used as an extrusion aid. A sufficient amount of deionized water was added to form an extrudable mixture with a solids content in the range of about 50–65 wt. %. The mixture was then extruded. However, the extrusion failed since the muller mix formed a gummy material inside the extruder which plugged the die plate. The composition of the titania-bound ZSM-5 catalyst is set forth in Table 1.

EXAMPLE 3

An n-propyl amine-containing ZSM-5 was ammonium exchanged with 5 cc of $NH_4NO_3$ solution (1M) per gram of zeolite for 2 hours and then dried in an oven at 120° C. Titanium oxide hydrate sold by Kemira was used as the titania source and AZC sold by Magnesium Elektron was used as the binding agent. A physical mixture of 65 parts by weight ZSM-5, 29 parts by weight titania powder and 6 parts by weight AZC was mulled to form a uniform mixture. All components were blended based on parts by weight on a 100% solids basis. An additional 2 wt. % Methocel was used as an extrusion aid. A sufficient amount of deionized water was added to form an extrudable mixture with a solids content in the range of about 50–65 wt. %. The mixture was then extruded. However, the extrusion failed since the muller mix formed a gummy material inside the extruder which plugged the die plate. The composition of the titania-bound ZSM-5 catalyst is set forth in Table 1.

EXAMPLE 4

An n-propyl amine-containing ZSM-5 was ammonium exchanged with 5 cc of $NH_4NO_3$ solution (1M) per gram of zeolite for 2 hours and then dried in an oven at 120° C. Titanium oxide hydrate sold by Kemira was used as the titania source and $TiOCl_2$ sold by Kemira was used as the binding agent. A physical mixture of 65 parts by weight ZSM-5, 28 parts by weight titania powder and 7 parts by weight $TiOCl_2$ was mulled to form a uniform mixture. A sufficient amount of deionized water was added to form an extrudable mixture with a solids content in the range of about 50–65 wt. %. The mixture was then extruded; however, the extrusion failed. The muller mix formed a gummy material which plugged both the auger and the die plate. The composition of the titania-bound ZSM-5 catalyst is set forth in Table 1.

EXAMPLE 5

An n-propyl amine-containing ZSM-5 was ammonium exchanged with 5 cc of $NH_4NO_3$ solution (1M) per gram of zeolite for 2 hours and then dried in an oven at 120° C. Titanium oxide hydrate sold by Kemira was used as the titania source and titanium isopropoxide sold by Alfa was used as the binding agent. A physical mixture of 65 parts by weight ZSM-5, 27 parts by weight titania powder and 8 parts by weight titanium isopropoxide was mulled to form a uniform mixture. A sufficient amount of deionized water was added to form an extrudable mixture with a solids content in the range of about 50–65 wt. %. However, the mulling failed. The titanium isopropoxide reacted vigorously upon contacting with moisture and formed titania solid, which could not be mixed homogeneously. The composition of the titania-bound ZSM-5 catalyst is set forth in Table 1.

EXAMPLE 6

An n-propyl amine-containing ZSM-5 was ammonium exchanged with 5 cc of $NH_4NO_3$ solution (1M) per gram of zeolite for 2 hours and then dried in an oven at 120° C. Titanium oxide hydrate sold by Kemira was used as the titania source and colloidal silica was used as the binding agent. A physical mixture of 65 parts by weight ZSM-5, 27 parts by weight titania powder and 8 parts by weight colloidal silica was mulled to form a uniform mixture. A sufficient amount of deionized water was added to form an extrudable mixture with a solids content in the range of about 50–65 wt. %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 1.

EXAMPLE 7

An n-propyl amine-containing ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and an aqueous slurry of titanium oxide hydrate was used as the binding agent. A physical mixture of 65 parts by weight ZSM-5, 27 parts by weight titania powder and 8 parts by weight aqueous slurry of titanium oxide hydrate was mulled to form a uniform mixture. All components were blended based on parts by weight on a 100% solids basis. An additional 2 wt. % Methocel was used as an extrusion aid. A sufficient amount of deionized water was added to form an extrudable mixture with a solids content in the range of about 50–65 wt. %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 1.

TABLE 1

| Example | 1 | 2 | 3 | 4 | 5 | 6 | 7 |
|---|---|---|---|---|---|---|---|
| Wt. % TiO$_2$ binder | 35 | 33 | 29 | 28 | 27 | 27 | 27 |
| TiO$_2$ powder source | Titania | Titania | Titania | Titania | Titania | Titania | Titania |
| Wt. % binding agent | 0 | 2 | 6 | 7 | 8 | 8 | 8 |
| Binding agent type | — | AZC | AZC | TiOCl$_2$ | Titanium isopropoxide | Colloidal silica | Aqueous slurry of titanium oxide hydrate |
| Wt. % extrusion aid | 0 | 2 | 2 | 0 | 0 | 0 | 2 |
| Extrusion aid type | — | Methocel | Methocel | — | — | — | Methocel |
| Extrusion | OK | Failed | Failed | Failed | Failed | Good | Good |
| Crush strength, lb/in | 13 | NA | NA | NA | NA | 39 | 65 |
| Alpha activity | 319 | NA | NA | NA | NA | 222 | 389 |
| Na content, ppm | 105 | NA | NA | NA | NA | 890 | 49 |
| Sulfur content, wt. % | 0.015 | NA | NA | NA | NA | ~0.1 | ~0.1 |
| Surface area, m$^2$/g | 285 | NA | NA | NA | NA | 304 | 284 |
| Sorption capacity, wt. % | | | | | | | |
| Cyclohexane | 8.3 | NA | NA | NA | NA | 8.1 | 8.6 |
| n-Hexane | 10.1 | NA | NA | NA | NA | 10.5 | 9.7 |

The physical properties of the titania-bound ZSM-5 catalysts of Examples 1 to 7 are shown above in Table 1. The muller mix without any binding agent was extrudable, but the extrusion was difficult and the extrudates produced a catalyst with a poor crush strength of 13 lb/in (Example 1). Extrusions using AZC and TiOCl$_2$ failed since the muller mix formed gummy materials inside the extruder which plugged the die plate (Examples 2, 3 and 4). The extrusion using titanium isopropoxide also failed since it vigorously formed a titania gel upon contacting with moisture (Example 5). The extrusion using colloidal silica resulted in a catalyst with a crush strength of of 39 lb/in (Example 6). The extrusion using an aqueous slurry of titanium oxide hydrate results in an improved catalyst with a crush strength of 65 lb/in (Example 7).

EXAMPLE 8

An organic-free ZSM-5 was ammonium exchanged with 5 cc of NH$_4$NO$_3$ solution (1M) per gram of zeolite for 2 hours then dried in an oven at 120° C. Titanium oxide hydrate sold by Kemira was used as the titania source and no binding agent was used. A physical mixture of 65 parts by weight ZSM-5 and 35 parts by weight titania powder was mulled to form a uniform mixture. A sufficient amount of deionized water was added to form an extrudable mixture with a solids content in the range of about 50–65 wt. %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 2.

EXAMPLE 9

An organic free ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and AZC sold by Magnesium Elektron was used as the binding agent. A physical mixture of 65 parts by weight ZSM-5, 31 parts by weight titania powder and 4 parts by weight AZC was mulled to form a uniform mixture. A sufficient amount of deionized water was added to form an extrudable mixture with a solids content in the range of about 50–65 wt. %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The titania-bound ZSM-5 catalyst had the properties as set forth in Table 2.

EXAMPLE 10

An organic free ZSM-5 was ammonium exchanged with 5 cc of NH$_4$NO$_3$ solution (1M) per gram of zeolite for 2 hours and then dried in an oven at 120° C. Titanium oxide hydrate sold by Kemira was used as the titania source and AZC sold by Magnesium Elektron was used as the binding agent. A physical mixture of 65 parts by weight ZSM-5, 27 parts by weight titania powder and 8 parts by weight AZC was mulled to form a uniform mixture. A sufficient amount of deionized water was added to form an extrudable mixture with a solids content in the range of about 50–65 wt. %. The mixture was then extruded. However, the extrusion failed. The muller mix formed a gummy material inside the extruder which plugged the die plate. The composition of the titania-bound ZSM-5 catalyst is set forth in Table 2.

EXAMPLE 11

An organic free ZSM-5 was ammonium exchanged with 5 cc of $NH_4NO_3$ solution (1M) per gram of zeolite for 2 hours and then dried in an oven at 120° C. Titanium oxide hydrate sold by Kemira was used as the titania source and an aqueous slurry of titanium oxide hydrate was used as the binding agent. A physical mixture of 65 parts by weight ZSM-5, 31 parts by weight titania powder and 4 parts by weight aqueous slurry of titanium oxide hydrate was mulled to form a uniform mixture. A sufficient amount of deionized water was added to form an extrudable mixture with a solids content in the range of about 50–65 wt. %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 2.

EXAMPLE 12

An organic free ZSM-5 was ammonium exchanged with 5 cc of $NH_4NO_3$ solution (1M) per gram of zeolite for 2 hours and then dried in an oven at 120° C. Titanium oxide hydrate sold by Kemira was used as the titania source and an aqueous slurry of titanium oxide hydrate was used as the binding agent. A physical mixture of 65 parts by weight ZSM-5, 27 parts by weight titania powder and 8 parts by weight aqueous slurry of titanium oxide hydrate was mulled to form a uniform mixture. A sufficient amount of deionized water was added to form an extrudable mixture with a solids content in the range of about 50–65 wt. %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 2.

EXAMPLE 13

An organic free ZSM-5 was ammonium exchanged with 5 cc of $NH_4NO_3$ solution (1M) per gram of zeolite for 2 hours and then dried in an oven at 120° C. Titanium oxide hydrate sold by Kemira was used as the titania source and a 50 wt. % NaOH solution was used as the binding agent. A physical mixture of 65 parts by weight ZSM-5 and 35 parts by weight titania powder was mulled to form a uniform mixture. All components were blended based on parts by weight on a 100% solids basis. An additional 3 wt. % NaOH was added and mulled. All components were blended based on parts by weight on a 100% solids basis. A sufficient amount of deionized water was added to form an extrudable mixture with a solids content in the range of about 50–65 wt. %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound ZSM-5 catalyst are set forth in Table 2.

TABLE 2

| Example | 8 | 9 | 10 | 11 | 12 | 13 |
|---|---|---|---|---|---|---|
| Wt. % $TiO_2$ binder | 35 | 31 | 27 | 31 | 27 | 35 |
| $TiO_2$ powder source | Titania | Titania | Titania | Titania | Titania | Titania |
| Wt. % binding agent | 0 | 4 | 8 | 4 | 8 | 3 |
| Binding agent type | — | AZC | AZC | Aqueous slurry of titanium oxide hydrate | Aqueous slurry of titanium oxide hydrate | NAOH |
| Extrusion | OK | Good | Failed | Good | Good | Good |
| Crush strength, lb/in | 16 | 44 | NA | 38 | 53 | 31 |
| Alpha activity | 775 | 800 | NA | 785 | 782 | * |
| Na content, PPM | 70 | 230 | NA | 67 | 93 | 16,000 |
| Sulfur content, wt. % | 0.05 | 0.05 | NA | 0.05 | 0.15 | ~0.1 |
| Surface area, $m^2/g$ | 261 | 322 | NA | 262 | 260 | 225 |
| Sorption capacity, wt. % | | | | | | |
| Cyclohexane | 7.0 | 9.1 | NA | 9.3 | 6.9 | 7.0 |
| n-Hexane | 9.0 | 11.0 | NA | 9.4 | 9.0 | 9.1 |

*Too much Na present to calculate Alpha Activity without requirement of additional steps. The Alpha Activity is expected to be well below about 700.

The physical properties of the titania-bound ZSM-5 of Examples 8 to 13 are shown in Table 2. The muller mix without any binding agent was extrudable, but the extrusion was difficult and the extrudates produced a catalyst with a poor crush strength of 16 lb/in (Example 8). The extrusion using 4 wt. % AZC produced a catalyst with a 44 lb/in crush strength (Example 9). However, the extrusion using 8 wt. % AZC failed since the muller mix formed gummy materials inside the extruder which plugged the die plate (Example 10). The extrusions using an aqueous slurry of titanium oxide hydrate result in crush strengths of 38 and 53 lb/in (Examples 11 and 12). As the content of the aqueous slurry of titanium oxide hydrate increases, the finished catalyst has increased crush strength. The extrusion using NaOH resulted in a catalyst with 31 lb/in crush strength (Example 13). However, the integrity of the extrudates was diminished during an ammonium exchange to remove the excess sodium used for the binding.

EXAMPLE 14

A tetraethyl ammonium-containing zeolite Beta was ammonium exchanged with 5 cc of $NH_4NO_3$ solution (1M) per gram of zeolite for 2 hours and then dried in an oven at 120° C. Titanium oxide hydrate sold by Kemira was used as the titania source and AZC sold by Magnesium Elektron was used as the binding agent. A physical mixture of 65 parts by weight zeolite Beta, 31 parts by weight titania powder and 4 parts by weight AZC was mulled to form a uniform mixture. A sufficient amount of deionized water was added to form an extrudable mixture with a solids content in the range of about 50–65 wt. %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound zeolite beta catalyst are set forth in Table 3.

EXAMPLE 15

A tetraethyl ammonium-containing zeolite Beta was ammonium exchanged with 5 cc of $NH_4NO_3$ solution (1M) per gram of zeolite for 2 hours and then dried in an oven at 120° C. Titanium oxide hydrate sold by Kemira was used as the titania source and an aqueous slurry of titanium oxide hydrate was used as the binding agent. A physical mixture of 65 parts by weight zeolite Beta, 27 parts by weight titania powder and 8 parts by weight aqueous slurry of titanium oxide hydrate was mulled to form a uniform mixture. A sufficient amount of deionized water was added to form an extrudable mixture with a solids content in the range of about 50-65 wt. %. The mixture was extruded to produce 1/16" cylindrical shape extrudates and dried in an oven at 120° C. The extrudates were then calcined in nitrogen at 480° C. for 3 hours followed by calcination in air at 538° C. for 6 hours. The composition and physical properties of the titania-bound zeolite beta catalyst are set forth in Table 3.

TABLE 3

| Example | 14 | 15 |
|---|---|---|
| Wt. % $TiO_2$ binder | 31 | 27 |
| $TiO_2$ powder source | Titania | Titania |
| Wt. % binding agent | 4 | 8 |
| Binding agent type | AZC | Aqueous slurry of titanium oxide hydrate |
| Extrusion | Poor | Good |
| Crush strength, lb/in | 23 | 28 |
| Alpha activity | 382 | 474 |
| Na content, ppm | ~200 | 72 |
| Sulfur content, wt. % | ~0.1 | 0.015 |
| Surface area, m²/g | 473 | 442 |
| Sorption capacity, wt. % | | |
| Cyclohexane | 14.5 | 13.0 |
| n-Hexane | 19.5 | 16.1 |

Table 3 shows improved crush strength of the titania-bound zeolite Beta catalyst using an aqueous slurry of hydrous titania. The extrusion using AZC as the binder material resulted in a catalyst crush strength of 23 lb/in (Example 14) while the extrusion using an aqueous slurry of titanium oxide hydrate resulted in a catalyst with an improved crush strength of 28 lb/in (Example 15).

EXAMPLE 16

Preparation of ZSM-5/$Al_2O_3$ Catalyst

A physical mixture of 65 parts ZSM-5 and 35 parts psuedoboehmite alumina powder (LaRoche Versal alumina) was mulled to form a uniform mixture. All components were blended to on parts by weight on a 100% solids basis. The mixture was auger extruded to 1/16" cylindrical shape extrudates and dried at 127° C. The extrudates were then nitrogen calcined at 480° C. for 3 hours followed by a 6 hour air calcination at 538° C. The composition and physical properties of the final catalyst are shown in Table 4.

EXAMPLE 17

Preparation of ZSM-5/$SiO_2$ Catalyst

A physical mixture of 65 parts ZSM-5, 17.5 parts silica oxide powder (Nasilco Ultrasil VN3SP) and 17.5 colloidal silica (DuPont Ludox) solution was mulled to form a uniform mixture. A binding agent, 3 wt. % NaOH, was added to improve the crush strength. All components were blended based on parts by weight on a 100% solids basis. Sufficient amount of deionized water was added to form an extrudable paste. The mixture was auger extruded to 1/16" cylindrical shape extrudates and dried at 127° C. The extrudates were ammonium exchanged with 1M $NH_9NO_3$ solution (5 cc/gm) at room temperature for 2 hours. The exchange was repeated one more time followed by washing with DI water. The exchanged catalyst was dried at 120° C., then nitrogen calcined at 480° C. for 3 hours followed by a 6 hour air calcination at 538° C.

EXAMPLE 18

Preparation of ZSM-5/$TiO_2$ Catalyst

Organic-free ZSM-5 was ammonium exchanged with 5 cc of $NH_4NO_3$ solution (1M) per g of zeolite for 2 hrs. and then dried overnight at 120° C.

A physical mixture of 65 parts ZSM-5, 27 parts titanium oxide hydrate (Kemira's Uniti 906), and 8 parts aqueous slurry of titanium oxide hydrate (Kemira's Uniti 902 Hydrolysate) was mulled to form a uniform mix. A sufficient amount of deionized water was added to form an extrudable mix with a solid content of 50-65%. The mix was extruded to produce 1/16" cylindrical shape extrudates and dried overnight at 120° C. The extrudates were then nitrogen calcined at 480° C. for 3 hours followed by a 6 hour air calcination at 538° C. The composition and physical properties of the final ZSM-5/$TiO_2$ catalyst are shown in Table 4.

EXAMPLE 19

Preparation of ZSM-5/$ZrO_2$ Catalyst

A physical mixture of 65 parts organic-free ZSM-5, 31 parts zirconium oxide powder, and 4 parts AZC (Magnesium Elektron Ammonium Zirconium Carbonate, 20% $ZrO_2$) solution was mulled to form a uniform mixture. All components were blended based on parts by weight on a 100% solids basis. Sufficient amount of deionized water was added to form an extrudable paste. The mixture was auger extruded to 1/16" cylindrical shape extrudates and dried at 127° C. The extrudates were then nitrogen calcined at 480° C. for 3 hours followed by a 6 hour air calcination at 538° C. The properties of the final catalyst are listed in Table 4.

EXAMPLE 20

Preparation of ZSM-5/$TiO_2$ Catalyst

ZSM-5 containing organic directing agent was ammonium exchanged with 5 cc of $NH_4NO_3$ solution (1M) per g of zeolite for 2 hrs and then dried at 120° C.

A physical mixture of 65 parts ZSM-5, 27 parts titanium oxide hydrate (Kemira's Uniti 906) and 8 parts hydrous titanium oxide hydrate slurry (Kemira's Uniti 902) was mulled to form a uniform mix. Two weight percent of Methocel (hydroxypropyl methylcellulose) was used as an extrusion aid. A sufficient amount of deionized water was added to form an extrudable mix with a solid content of 50-65 wt. %. The mix was extruded to produce 1/16" cylindrical shape extrudates and dried in an oven at 120° C. The extrudates were the nitrogen calcined at 480° C. for 3 hours followed by a 6 hour air calcination at 538° C. The final ZSM-5/titania catalyst had the physical properties shown in Table 4.

EXAMPLE 21

Preparation of Zeolite Beta/SiO$_2$

A physical mixture of 83 parts zeolite beta, 8.5 parts silica oxide powder (Nasilco Ultrasil VN3SP) and 8.5 parts colloidal silica (duPont Ludox) solution was mulled to form a uniform mixture. All components were blended based on parts by weight on a 100% solids basis. Sufficient amount of deionized water was added to form an extrudable paste. The mixture was auger extruded to 1/16" cylindrical shape extrudates and dried at 127° C. The extrudates were ammonium exchanged with 1M NH$_4$NO$_3$ solution (5 cc/g catalyst) at room temperature for 2 hours. The exchange was repeated one more time followed by washing of extrudates with deionized water. The exchanged catalyst was dried at 120° C., then nitrogen calcined at 480° C. for 3 hours followed by a 6 hour air calcination at 538° C. The properties of the final catalyst are listed in Table 5.

EXAMPLE 22

Preparation of Zeolite Beta/TiO$_2$ Catalyst

Zeolite beta was ammonium exchanged with 5 cc of NH$_4$NO$_3$ solution (1M) per g of zeolite for 2 hrs and then dried at 120° C.

A physical mixture of 65 parts zeolite Beta, 27 parts titanium oxide hydrate (Kemira's Uniti 906), and 8 parts aqueous slurry of titanium oxide hydrate (Kemira's Uniti 902) was mulled to form a uniform mixture. A sufficient amount of deionized water was added to form an extrudable mix with a solid content of 50–65 wt. %. The mix was extruded to produce 1/16" cylindrical shape extrudates and dried in a oven at 120° C. The extrudates were then nitrogen calcined at 480° C. for 3 hours followed by a 6 hour air calcination at 538° C. The final zeolite beta/titania catalyst had the physical properties shown in Table 5.

EXAMPLE 23

Preparation of Zeolite Beta/ZrO$_2$ Catalyst

A physical mixture of 70 parts zeolite Beta, 24 parts zirconium oxide powder and 6 parts AZC (Magnesium Elektron Ammonium Zirconium Carbonate, 20% ZrO$_2$) solution was mulled to form a uniform mixture. All components were blended based on parts by weight on a 100% solids basis. Sufficient amount of deionized water was added to form an extrudable paste. The mixture was auger extruded to 1/16" cylindrical shape extrudates and dried at 127° C. The extrudates were then nitrogen calcined at 480° C. for 3 hours followed by a 9 hour air calcination at 538° C. The properties of the finished catalyst are summarized in Table 5.

TABLE 4

| | Binding of ZSM-5 and Properties of Final ZSM-5 Catalysts | | | | |
|---|---|---|---|---|---|
| Example | 16 | 17 | 18 | 19 | 20 |
| Zeolite | ZSM-5 | ZSM-5 | ZSM-5 | ZSM-5 | ZSM-5 |
| Wt. % Binder | 35% Al$_2$O$_3$ | 35% SiO$_2$ | 35% TiO$_2$ | 35% ZrO$_2$ | 35% TiO$_2$ |
| Binder Source | Versal alumina | Ultrasil silica | Uniti 906 titania | Zirconia Grade S | Uniti 906 titania |
| Wt % Binding Agent | 0 | 17.5 | 8 | 4 | 8 |
| Binding Agent Type | — | coloidal silica | hydrous titania | AZC | hydrous titania |
| Wt % Extrusion Aid | 0 | 3 | 0 | 0 | 2 |
| Extrusion Aid Type | — | NAOH | — | — | Methocel |
| Crush Strength lb/in | NA | NA | 15 | 18 | 65 |
| Alpha Activity | >700 | NA | 974 | 622 | 389 |
| Na Content, ppm | NA | 275 | 52 | 205 | 49 |
| Surface Area m$^2$/g | >200 | 279 | 238 | 241 | 284 |
| Cyclohexane Sorption Capacity, wt % | NA | 5.3 | 6.5 | 6.0 | 8.6 |
| n-Hexane Sorption Capacity, wt % | NA | 8.9 | 8.4 | 8.0 | 9.7 |

TABLE 5

| | Binding of ZSM-5 and Properties of Final Zeolite Beta Catalysts | | |
|---|---|---|---|
| Example | 21 | 22 | 23 |
| Zeolite | Beta | Beta | Beta |
| Wt. % Binder | 17% SiO$_2$ | 35% TiO$_2$ | 30% ZrO$_2$ |
| Binder Source | Ultrasil silica | Uniti 906 titania | Zirconia Grade S |
| Wt % Binding Agent | 8.5 | 8 | 6 |
| Binding Agent Type | colloidal silica | hydrous titania | AZC |
| Crush Strength (lb/in) | 34 | 28 | 43 |
| Alpha Activity | 466 | 474 | 359 |
| Na Content, ppm | 65 | 72 | — |
| Surface Area (m$^2$/g) | — | 442 | 424 |
| Cyclohexane Sorption Capacity, wt % | — | 16.1 | 16.3 |
| n-Hexane Sorption Capacity, wt % | NA | 13.0 | 12.8 |

EXAMPLES 24–30

Selected catalysts from the previous examples were evaluated for NO$_x$ conversion activity using a low oxygen catalytic reduction activity test described as follows: Low oxygen conditions generally pose a more severe test on typical SCR catalysts. Since oxygen is generally recognized to play a role in intermediate formation as part of the overall NO$_x$ reduction process.

Examples 24-30 were conducted by passing approximately 100 ppm of NH$_3$, 100 ppm of NO and 1200 ppm O$_2$ in helium over the catalysts at a rate of 12,000 cm$^3$ gas per gram zeolite per hour. The NO$_x$ conversion was measured using a chemiluminescence detector. The results of Examples 16-23 (shown in Table 4) demonstrate that the titania, zirconia and silica binders of the invention improve NO$_x$ conversion at elevated temperatures in comparison with alumina binders.

TABLE 6

| Example No. | Catalyst | NO$_x$ Conversion at Temperature | |
|---|---|---|---|
| | | 350° C. | 450° C. |
| 24 | ZSM-5/TiO$_2$ (Example 18) | 43 | 84 |
| 25 | ZSM-5/ZrO$_2$ (Example 19) | 41 | 58 |
| 26 | ZSM-5/SiO$_2$ (Example 17) | 38 | 48 |
| 27 | ZSM-5/Al$_2$O$_3$ (Example 16) | 25 | 37 |
| 28 | Beta/SiO$_2$ (Example 21) | 44 | 54 |
| 29 | Beta/TiO$_2$ (Example 22) | 60 | 62 |
| 30 | Beta/ZrO$_2$ (Example 23) | 77 | 71 |

EXAMPLE 31

The SCR activities of catalyst extrudates were evaluated in accordance with the following procedure:

A measured volume of pelletized (14-20 mesh) catalyst was packed into a glass reactor, the temperature of the catalyst bed is monitored and by a thermocouple placed in a thermowell centered on top of the catalyst bed. A gas stream containing 500 ppm NO, 500 ppm NH$_3$, and 5% O$_2$ in balance He was passed over the catalyst at a space velocity of 12,000 hr$^{-1}$. The gas stream is heated in the reactor preheater region before entering the catalyst bed. The effluent from the catalyst was continuously analyzed by IR. DeNO$_x$ activities are shown below in Table 7.

Catalyst preparations from the cited examples were also evaluated using a high oxygen catalytic reduction test described as follows. These test conditions more closely approximate those found in typical flue gas application.

TABLE 7

| Temp. °C. | NO$_x$ Conversion | | | |
|---|---|---|---|---|
| | ZSM-5/Al$_2$O$_3$ (Examp. 16) | ZSM-5/SiO$_2$ (Examp. 17) | ZSM-5/ZrO$_2$ (Examp. 19) | Beta/ZrO$_2$ (Examp. 23) |
| 550 | 79 | 95 | 85 | 94 |
| 455 | 80 | 96 | 91 | 98 |
| 400 | 80 | 95 | 91 | 98 |
| 345 | 69 | 84 | 81 | 98 |
| 250 | 18 | 35 | 16 | 77 |

Changes and modifications in the specifically described embodiments can be carried out without departing from the scope of the invention which is intended to be limited only by the scope of the appended claims.

What is claimed is:

1. A process for converting noxious nitrogen oxides present in oxygen-containing gaseous effluents to N$_2$ and H$_2$O comprising reacting the gaseous effluent with an amount of ammonia effective to reduce said noxious nitrogen oxides to nitrogen in the presence of a zeolite catalyst having a Constraint Index of up to about 12, said catalyst being composited with a titania binder by the steps of:
   (a) providing a substantially homogenous mixture of molecular sieve material, a low acidity titanium oxide, titanium oxide hydrate and sufficient water to provide an extrudable mass;
   (b) extruding the extrudable mass resulting from step (a); and
   (c) calcining the extrudate resulting from step (b).

2. The process of claim 1 wherein said zeolite has the crystal structure of at least one selected from the group consisting of ZSM-5, ZSM-11, ZSM-12, ZSM-22, ZSM-23, ZSM-35, ZSM-38, ZSM-48, mordenite, dealuminated Y and Zeolite Beta.

3. The process of claim 1 wherein said reaction is carried out at temperature of from about 200° to 700° C.

4. The process of claim 3 wherein said temperature exceeds about 275° C.

5. The process of claim 1 wherein said reaction is carried out at GHSV of from about 200 to about 100,000.

6. The process of claim 1 wherein the molecular sieve component is a large-pore zeolite.

7. The process of claim 1 wherein the molecular sieve component is selected from the group consisting of molecular sieves having the structure of zeolite Y, zeolite L, zeolite Beta, ZSM-4, ZSM-20 and mordenite.

8. The process of claim 6 wherein the molecular sieve component has the structure of zeolite Beta.

9. The process of claim 1 wherein the molecular sieve component is selected from the group consisting of molecular sieves having the structure of VPI-5, SAPO-11, SAPO-17, SAPO-34, SAPO-37, MCM-36, and MCM-41.

10. The process of claim 1 further comprising adding no alumina-containing binder to the homogeneous mixture of step (a).

* * * * *

UNITED STATES PATENT AND TRADEMARK OFFICE
CERTIFICATE OF CORRECTION

PATENT NO. : 5,417,949
DATED : May 23, 1995
INVENTOR(S) : J. P. McWilliams et al.

It is certified that error appears in the above-indentified patent and that said Letters Patent is hereby corrected as shown below:

In Claim 8, Col. 18, line 50, "6" should be --7--.

Signed and Sealed this

Twenty-ninth Day of August, 1995

BRUCE LEHMAN

*Attest:*

*Attesting Officer*     *Commissioner of Patents and Trademarks*